US011645303B2

(12) United States Patent
Liu

(10) Patent No.: US 11,645,303 B2
(45) Date of Patent: May 9, 2023

(54) DATA SYNCHRONIZATION METHOD AND APPARATUS OF DISTRIBUTED SYSTEM, MEDIUM, AND ELECTRONIC DEVICE

(71) Applicant: Tencent Technology (Shenzhen) Company Limited, Shenzhen (CN)

(72) Inventor: Pan Liu, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 62 days.

(21) Appl. No.: 17/154,745

(22) Filed: Jan. 21, 2021

(65) Prior Publication Data

US 2021/0141804 A1    May 13, 2021

Related U.S. Application Data

(63) Continuation of application No. PCT/CN2020/096119, filed on Jun. 15, 2020.

(30) Foreign Application Priority Data

Jul. 15, 2019    (CN) .......................... 201910636195.1

(51) Int. Cl.
*G06F 15/16*    (2006.01)
*G06F 16/27*    (2019.01)
(Continued)

(52) U.S. Cl.
CPC .......... *G06F 16/27* (2019.01); *G06F 16/2365* (2019.01); *H04L 43/08* (2013.01); *H04L 67/1095* (2013.01)

(58) Field of Classification Search
None
See application file for complete search history.

(56) References Cited

U.S. PATENT DOCUMENTS 10,268,410 B2    4/2019    Pattabiraman et al.
2008/0069023 A1*    3/2008    Rubin ..................... H04L 45/02
370/312
(Continued)

FOREIGN PATENT DOCUMENTS

CN    103281707 A    9/2013
CN    105592488 A    5/2016
(Continued)

OTHER PUBLICATIONS

Search Report from the China State Intellectual Property Office for Application No. CN 2019106361951 dated Mar. 1, 2021 (only Chinese language), (8 pages).
(Continued)

*Primary Examiner* — Alex Gofman
(74) *Attorney, Agent, or Firm* — Crowell & Moring LLP

(57) ABSTRACT

Embodiments of this application provide a data synchronization method and apparatus in a distributed system, a computer-readable medium, and an electronic device. The method includes: obtaining historical data synchronization information of adjacent nodes connected to a target node and determining selection weight values of the adjacent nodes according to the historical data synchronization information. The selection weight values are used for measuring efficiency of the adjacent nodes synchronizing data to the target node to select, according to the selection weight values of the adjacent nodes, a target adjacent node for synchronizing data to the target node. Target data is synchronized from the selected target adjacent node with the target node.

20 Claims, 7 Drawing Sheets

(51) Int. Cl.
  *G06F 16/23* (2019.01)
  *H04L 43/08* (2022.01)
  *H04L 67/1095* (2022.01)

(56) References Cited

U.S. PATENT DOCUMENTS

| | | | | |
|---|---|---|---|---|
| 2017/0086159 A1* | 3/2017 | Ameixiera | ............ | H04W 48/12 |
| 2017/0161296 A1* | 6/2017 | Ritter | ................... | G06F 16/178 |
| 2017/0195416 A1* | 7/2017 | Swanson | ............... | H04L 67/104 |
| 2017/0329635 A1* | 11/2017 | Rathke | ................. | G06F 9/5077 |
| 2019/0278758 A1* | 9/2019 | Zhang | ................... | H04L 63/102 |
| 2020/0076603 A1* | 3/2020 | Li | ........................ | H04L 63/123 |
| 2020/0204352 A1* | 6/2020 | Thompson | ............ | H04L 9/3247 |
| 2021/0176160 A1 | 6/2021 | Yang et al. | | |

FOREIGN PATENT DOCUMENTS

| | | |
|---|---|---|
| CN | 106506638 A | 3/2017 |
| CN | 106792714 A | 5/2017 |
| CN | 108848184 A | 11/2018 |
| CN | 108924223 A | 11/2018 |
| CN | 109241185 A | 1/2019 |
| CN | 109274754 A | 1/2019 |
| CN | 109450664 A | 3/2019 |
| CN | 109889589 A | 6/2019 |
| CN | 110365768 A | 10/2019 |
| JP | 11-306151 | 11/1999 |
| JP | 2012/086041 | 6/2012 |
| JP | 2013-186692 | 9/2013 |
| JP | WO2014/076838 | 5/2014 |
| JP | 2017-073000 | 4/2017 |
| WO | WO 2007/049159 A2 | 5/2007 |

OTHER PUBLICATIONS

International Search Report and Written Opinion received for Application No. PCT/CN2020/096119 dated Aug. 27, 2020 (English and Chinese languages), (10 pages).

Office Action for Japan Patent Application No. 2021-514604 dated May 16, 2022 (English and Japanese languages) (7 pages).

* cited by examiner

DATA SYNCHRONIZATION METHOD AND APPARATUS OF DISTRIBUTED SYSTEM, MEDIUM, AND ELECTRONIC DEVICE

RELATED APPLICATION

This application is a continuation application of PCT Patent Application No. PCT/CN2020/096119, filed on Jun. 15, 2020, which claims priority to Chinese Patent Application No. 201910636195.1, entitled "DATA SYNCHRONIZATION METHOD AND APPARATUS OF DISTRIBUTED SYSTEM, MEDIUM, AND ELECTRONIC DEVICE" filed on Jul. 15, 2019, both of which are incorporated by reference in their entireties.

FIELD OF THE TECHNOLOGY

This application relates to the field of computer technologies, and in particular, to a data synchronization method and apparatus of a distributed system, a medium, and an electronic device.

BACKGROUND OF THE DISCLOSURE

A distributed system is a system composed of a group of computer nodes that communicate through a network and work in coordination to complete a common task. In the distributed system, each node is used for calculating or storing data, and in the distributed system, a data synchronization operation may need to be performed between nodes. For example, in a blockchain system, when a new blockchain node is added, data needs to be synchronized from another blockchain node.

SUMMARY

An objective of this application is to provide a data synchronization method and apparatus of a distributed system, a computer-readable storage medium, and an electronic device, to at least shorten time of data synchronization in the distributed system and improve synchronization efficiency.

Other features and advantages of this application become obvious through the following detailed descriptions, or may be learned partially by the practice of this application.

According to an aspect of embodiments of this application, a data synchronization method of a distributed system is provided, the method including:
obtaining historical data synchronization information of adjacent nodes connected to a target node;
determining selection weight values of the adjacent nodes according to the historical data synchronization information, the selection weight values being used for measuring efficiency of the adjacent nodes synchronizing data to the target node; and
selecting, according to the selection weight values of the adjacent nodes, a target adjacent node for synchronizing data to the target node, and synchronizing target data in the target adjacent node to the target node.

According to an aspect of the embodiments of this application, a data synchronization apparatus of a distributed system is provided, the apparatus including: an obtaining module, configured to obtain historical data synchronization information of adjacent nodes connected to a target node; a determining module, configured to determine selection weight values of the adjacent nodes according to the historical data synchronization information, the selection weight values being used for measuring efficiency of the adjacent nodes synchronizing data to the target node; a selection module, configured to select, according to the selection weight values of the adjacent nodes, a target adjacent node for synchronizing data to the target node; and a synchronization module, configured to synchronize target data in the target adjacent node to the target node.

According to an aspect of the embodiments of this application, a computer-readable storage medium is provided, storing a computer program, the computer program including executable instructions. The executable instructions, when executed by a processor, implement the data synchronization method of a distributed system in the foregoing embodiments.

According to an aspect of the embodiments of this application, an electronic device is provided, including: one or more processors; and a memory, configured to store executable instructions of the processors. The executable instructions, when executed by the one or more processors, cause the one or more processors to implement the data synchronization method of a distributed system in the foregoing embodiments.

BRIEF DESCRIPTION OF THE DRAWINGS

The foregoing and other features and advantages of this application will become more apparent from the detailed description of exemplary embodiments of this application made with reference to the accompanying drawings.

DESCRIPTION OF EMBODIMENTS

Figure 1:
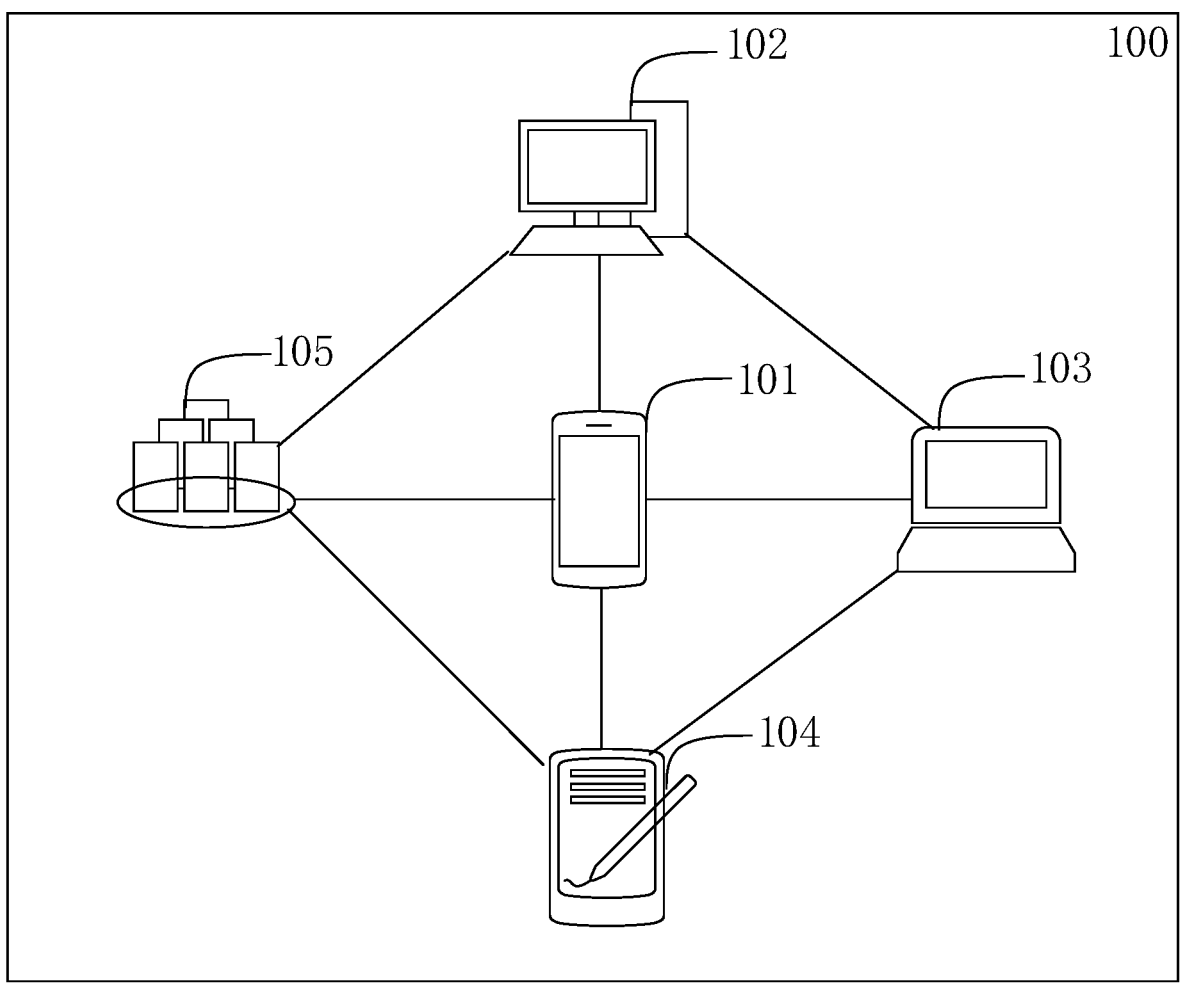
FIG. 1 is a schematic diagram of an application scenario of a data synchronization method in a distributed system according to an embodiment of this application.

Exemplary embodiments will be described more comprehensively with reference to the accompanying drawings. However, the exemplary embodiments can be implemented in various forms, and are not to be construed as being limited to the implementations described herein. Instead, the implementations are provided to make this application more comprehensive and complete, and fully convey the ideas of the exemplary embodiments to a person skilled in the art. In the figures, for clarity, dimensions of some elements may be exaggerated or altered. Same reference numerals in the figures represent same or similar structures, and therefore detailed descriptions of the structures will be omitted.

In addition, the described features, structures, or characteristics may be combined in one or more embodiments in any appropriate manner. In the following descriptions, a lot of specific details are provided to give a full understanding of the embodiments of this application. However, a person skilled in the art is to be aware that the technical solutions in this application may be implemented without one or more of the particular details, or other methods or elements may be used. In other cases, well-known structures, methods, or operations are not shown or described in detail, so as not to obscure the aspects of this application.

In the current distributed system, a data synchronization operation between nodes usually has the problems of slow data synchronization and low synchronization efficiency.

In view of this, this application provides a data synchronization method and apparatus of a distributed system, a medium, and an electronic device, to solve the foregoing technical problems of slow data synchronization and low data synchronization efficiency of nodes in a distributed system.

First, an application scenario of the data synchronization method of a distributed system is explained.

FIG. 1 is a schematic diagram of an application scenario of a data synchronization method in a distributed system.

As shown in the figure, a scenario 100 is a part of the distributed system, where each of electronic devices 101, 102, 103, 104, and 105 is a node in the distributed system, and examples of the electronic device included but are not limited to a portable mobile device such as a smartphone, a tablet computer, or a notebook computer or a fixed device such as a computer device, a field terminal, a desktop computer, a server, or a workstation. An implementation environment of this application can be any node in the entire distributed system. As shown in FIG. 1, the smartphone 101 can be used as a target node for data synchronization, and the desktop computer 102, the notebook computer 103, the tablet computer 104, and the workstation 105 are used as adjacent nodes of the smartphone 101. According to this application, in a process of data synchronization, the smartphone 101 first simultaneously obtains historical data synchronization information of historical data synchronization performed by the desktop computer 102, the notebook computer 103, the tablet computer 104 and the workstation 105, then determines, according to the historical data synchronization information, selection weight values used for measuring efficiency of the adjacent nodes synchronizing data to the smartphone 101, and finally selects, according to the selection weight values, a target adjacent node for synchronizing data to the smartphone 101 and completes the data synchronization process. The device types, device numbers, and arrangement shown in FIG. 1 is merely one example and other devices and arrangements (e.g. target node connections with adjacent nodes and the number of adjacent nodes) are considered for the distributed system 100.

In this application, data transmission between nodes in the distributed system can be implemented through a communication connection (including, but not limited to, a wired communication network connection or a wireless communication network connection).

According to a first aspect of this application, a data synchronization method of a distributed system is provided.

Figure 2:
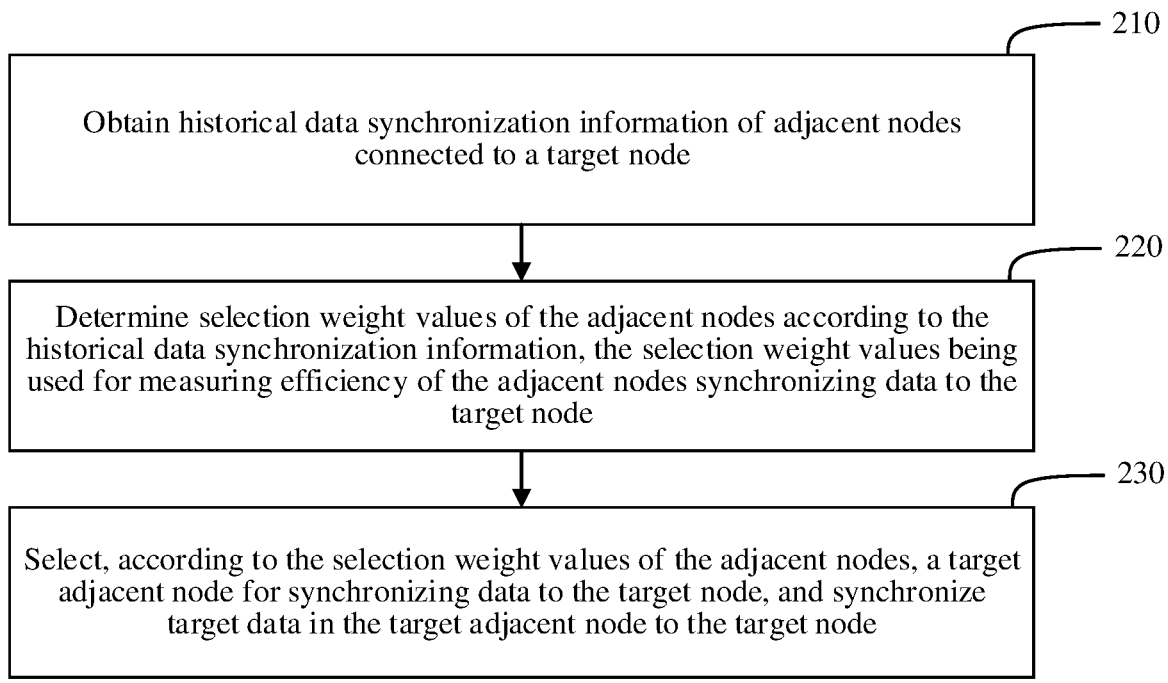
FIG. 2 is a flowchart of a data synchronization method of a distributed system according to an embodiment of this application.

FIG. 2 is a flowchart of a data synchronization method of a distributed system. An execution body of the data synchronization method may be a node that is included in the distributed system and that needs to perform data synchronization, for example, an electronic device that acts as any node. The data synchronization method may include the following steps:

Step 210: Obtain historical data synchronization information of adjacent nodes connected to a target node.

Step 220: Determine selection weight values of the adjacent nodes according to the historical data synchronization information, the selection weight values being used for measuring efficiency of the adjacent nodes synchronizing data to the target node.

Step 230: Select, according to the selection weight values of the adjacent nodes, a target adjacent node for synchronizing data to the target node, and synchronize target data in the target adjacent node to the target node.

The above implementation steps will be described in detail below.

About step 210: Obtain historical data synchronization information of adjacent nodes connected to a target node.

Specifically, the target node refers to a node that needs to perform data synchronization in a distributed system, for example, any node in a blockchain system. The adjacent nodes refer to other nodes connected to the target node in the distributed system.

Figure 3:
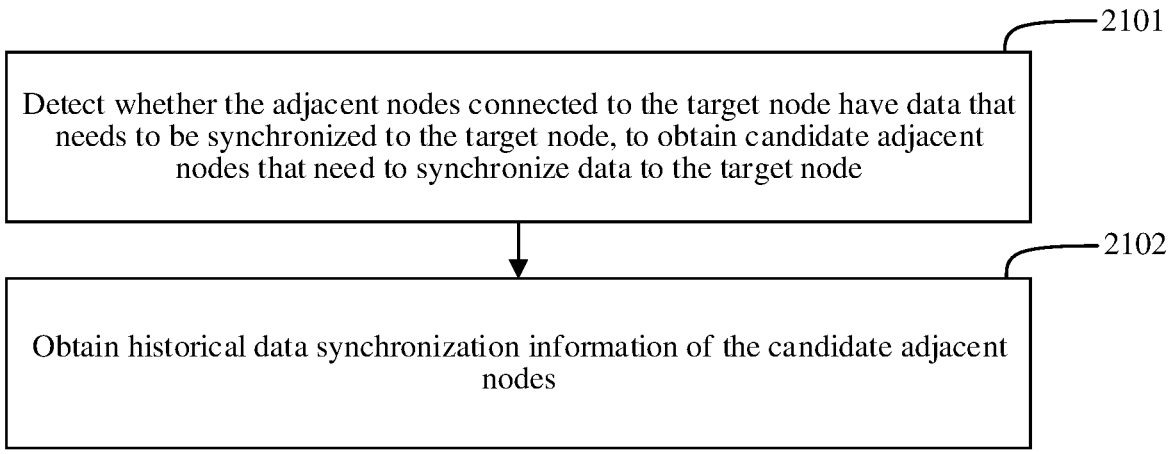
FIG. 3 is a detailed flowchart of step 210 shown in FIG. 2 according to an embodiment of this application.

In an exemplary embodiment, the process of obtaining historical data synchronization information of the adjacent nodes connected to the target node in step 210 may be completed in a way shown in FIG. 3, and, in one embodiment, includes the following steps:

Step 2101: Detect whether the adjacent nodes connected to the target node have target data that needs to be synchronized to the target node, to obtain candidate adjacent nodes that need to synchronize the target data to the target node.

In a specific implementation of one embodiment, the distributed system may include a blockchain system, and the target data may include block data. The detecting whether the adjacent nodes connected to the target node have data that needs to be synchronized to the target node may be implemented in the following manner:

First, a height of a first block header of a blockchain ledger in the target node is obtained. Then, a height of a second block header of the blockchain ledger in the adjacent nodes connected to the target node is obtained. Finally, the height of the first block header is compared with the height of the second block header to detect whether the adjacent nodes connected to the target node have data that needs to be synchronized to the target node.

Specifically, one function of the blockchain system being a type of distributed system is to store data. Any data that needs to be stored can be written into or read from a blockchain. Data in the blockchain exists in the form of blocks, that is, a block is a basic unit of the entire blockchain data. A block includes a block header and a block body. The block header records current characteristic value data of the block, such as current time, a height of the block header, the hash of a previous block, and the hash of the block body. The block body records actual data that needs to be stored. The blocks in the blockchain are connected in a strict order in one direction to form a data chain. In the blockchain system, a block is generated at regular intervals, and the new generated block is connected to the previous generated block from behind. As time goes by, the blockchain data will be continuously updated. In addition, in the blockchain system, after a new server is added to a blockchain network to become a node, the newly added node needs to synchronize the block data in the blockchain system, and with continuous update of the blockchain data, nodes in the blockchain system also need to continuously update the block data.

In the blockchain data, each piece of block data is unique, and therefore the identity of the each piece of block data can be identified by a block header height or a hash value in the block header. The block header height in the blockchain data gradually increases with the continuous update of the block, that is, each time a block is generated, the height of the block header of the new generated block will increase by 1. Based on this, this application uses the height of the block header to detect whether the adjacent nodes connected to the target node in the blockchain system have data that needs to be synchronized to the target node.

Specifically, the height of the first block header of the blockchain ledger in the target node and the height of the second block header of the blockchain ledger in the adjacent nodes connected to the target node are obtained respectively, and the height of the first block header is compared with the height of the second block header. If the height of the second block header is greater than the height of the first block header, it indicates that there is block data that needs to be synchronized to the target node in the adjacent nodes connected to the target node.

In the process of obtaining the historical data synchronization information of the adjacent nodes connected to the target node, by detecting whether the adjacent nodes connected to the target node have data that needs to be synchronized to the target node, candidate adjacent nodes that need to synchronize data to the target node can be obtained. One advantage of this is that only the selection weight values of the candidate adjacent nodes are determined, and the target adjacent node is selected from the candidate adjacent nodes, so that some adjacent nodes without data synchronization prospects can be filtered out, thereby reducing obtaining of some unnecessary historical data synchronization information, reducing storage and calculation load of a system, and improving the utilization rate of the historical data synchronization information.

Step 2102: Obtain historical data synchronization information of the candidate adjacent nodes.

In the foregoing embodiment, the advantage of detecting whether the adjacent nodes connected to the target node have data that needs to be synchronized to the target node to obtain candidate adjacent nodes that need to synchronize data to the target node is that, before obtaining the historical data synchronization information of the adjacent nodes, by detecting whether the adjacent nodes connected to the target node have data that needs to be synchronized to the target node, the candidate adjacent nodes with data synchronization prospects in all the adjacent nodes can be further determined. The advantage of this is that some adjacent nodes without data synchronization prospects can be filtered out, thereby reducing obtaining of some unnecessary historical data synchronization information, reducing both storage and calculation load of a system, and improving the utilization rate of the historical data synchronization information.

About step 220: Determine selection weight values of the adjacent nodes according to the historical data synchronization information, the selection weight values being used for measuring efficiency of the adjacent nodes synchronizing data to the target node.

Figure 4:
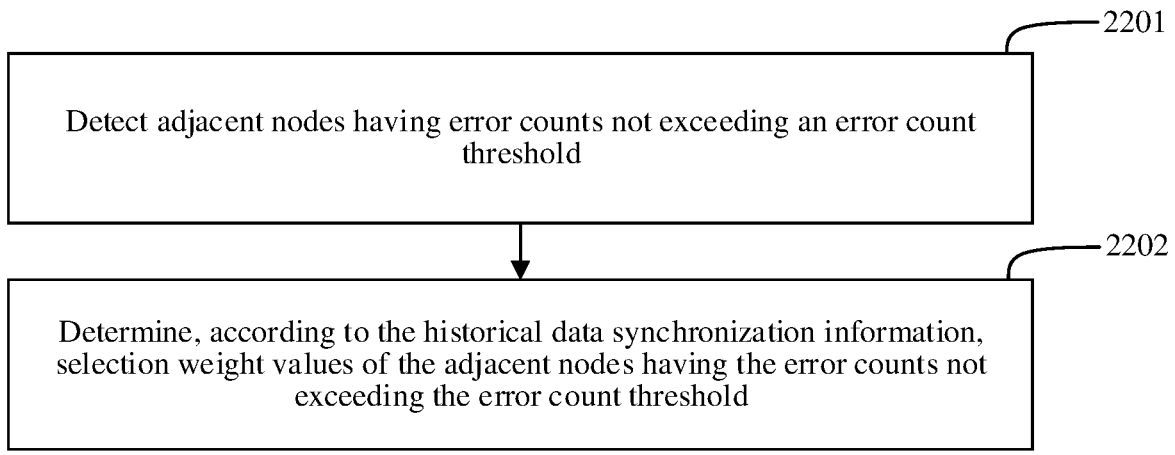
FIG. 4 is a detailed flowchart of step 220 shown in FIG. 2 according to an embodiment of this application.

In an exemplary embodiment, the historical data synchronization information may include the error counts of the target node and the adjacent nodes in the historical data synchronization process. The process of determining, according to the historical data synchronization information, the selection weight values of the adjacent nodes in step 220 may be shown in FIG. 4, and in one embodiment, includes the following steps:

Step 2201: Detect adjacent nodes having error counts not exceeding an error count threshold.

In this embodiment, the error counts refer to error counts of the target node and the adjacent nodes in a historical data synchronization process. Specifically, when data is synchronized between nodes in the distributed system, due to a reason such as a failure of a node or a failure of a data transmission network, a node synchronization failure inevitably occurs, for example, timeout of a data synchronization request, data abnormalities during a synchronous download process, or a failure of access to a node.

In this embodiment, by setting an error count threshold, screening can be performed on the adjacent nodes connected to the target node, that is, adjacent nodes having error counts exceeding a certain number are filtered out, and adjacent nodes having error counts not exceeding the certain number are retained. The finally retained adjacent nodes are used as candidates for subsequently determining the target adjacent node. The error count can be set according to actual conditions, for example, set to 3 times. If error counts of an adjacent node 1, an adjacent node 2, an adjacent node 3, and an adjacent node 4 are respectively 4, 3, 1 and 0 in the historical data synchronization process, adjacent nodes that are finally retained can be the adjacent node 2, the adjacent node 3, and the adjacent node 4.

Step 2202: Determine, according to the historical data synchronization information, selection weight values of the adjacent nodes having the error counts not exceeding the error count threshold.

According to the foregoing embodiment, by setting the error count threshold to filter out the adjacent nodes that often make errors in the data synchronization, and to retain the adjacent nodes having fewer error counts, a synchronization success rate of the data during subsequent synchronization can be improved. In addition, load of the system in calculating the selection weight value can be further reduced, thereby reducing calculation load of the system and improving data synchronization efficiency.

In an exemplary embodiment, the historical data synchronization information may include historical data transmission rate, and the determining selection weight values of the adjacent nodes according to the historical data synchronization information may include calculating the selection weight values of the adjacent nodes by the following formula:

$$W_i = \frac{\sum_{j=m+1}^{j=m+n} S_j}{n}$$

where $W_i$ represents the selection weight value of the $i^{th}$ adjacent node; j represents the historical data synchronization between the target node and the $i^{th}$ adjacent node for the $j^{th}$ time; m represents the historical data synchronization between the target node and the $i^{th}$ adjacent node for the $m^{th}$ time; n represents the number of times of the historical data synchronization between the target node and the $i^{th}$ adjacent node in the last n times; $S_j$ represents the historical data transmission rate in a case that the target node and the $i^{th}$ adjacent node perform historical data synchronization for the $j^{th}$ time.

Specifically, the historical data transmission rate may refer to a ratio of the size of the target data transmitted in the historical data synchronization process to the data transmission time, and the data transmission time may refer to a difference between the moment at which the target node completely receives the target data and the moment at which the target node requests to download the target data from the target adjacent node. For example, during a data synchronization process, if the moment at which the target node requests to download the target data from the target adjacent node is 12:00:00 on Jul. 1, 2019, and the moment at which the target node completely receives the target data is 12:00:03 on Jul. 1, 2019, the data transmission time is 3.00 seconds. If the size of the target data is 30 Mb, the historical data transmission rate is 10 Mb/s in this example.

In a specific implementation of one embodiment, an average value of data transmission rates of the target node and an adjacent node in the last 5 historical data synchronization processes may be required to serve as the selection weight value of the adjacent node. As shown in Table 1 below, the data transmission rates of the target node and an adjacent node in the last 5 historical data synchronization processes are: 10 Mb/s, 30 Mb/s, 20 Mb/s, 15 Mb/s, and 25 Mb/s. Therefore, through calculation, it can be determined that the selection weight value is: $W_i=20$.

TABLE 1

| j | $S_j$ |
|---|---|
| m + 5 | 10 Mb/s |
| m + 4 | 30 Mb/s |
| m + 3 | 20 Mb/s |
| m + 2 | 15 Mb/s |
| m + 1 | 25 Mb/s |

According to the foregoing embodiment, by calculating an average data transmission rate of the adjacent node in the last n times of historical data synchronization to serve as a factor in determining the selection weight value, the data synchronization efficiency of the adjacent node can be well measured, thereby making more targeted selection of target adjacent nodes, and further improving the data synchronization efficiency.

In an exemplary embodiment, the historical data synchronization information may include a historical data transmission rate and a historical data request moment, and the determining selection weight values of the adjacent nodes according to the historical data synchronization information may include: calculating the selection weight values of the adjacent nodes by the following formula:

$$W_i = \frac{\sum_{j=m+1}^{j=m+n} S_j + \sum_{j=m+1}^{j=m+n}(t-t_j)}{n}$$

where $W_i$ represents the selection weight value of the $i^{th}$ adjacent node; j represents the historical data synchronization between the target node and the $i^{th}$ adjacent node for the $j^{th}$ time; m represents the historical data synchronization between the target node and the $i^{th}$ adjacent node for the $m^{th}$ time; n represents the number of times of the historical data synchronization between the target node and the $i^{th}$ adjacent node in the last n times; $S_j$ represents the historical data transmission rate in a case that the target node and the $i^{th}$ adjacent node perform historical data synchronization for the $i^{th}$ time; $t_j$ represents the historical data request moment at which the target node and the $i^{th}$ adjacent node perform the historical data synchronization for the $i^{th}$ time; and t represents the moment at which the selection weight value of the $i^{th}$ adjacent node is calculated.

Specifically, in this embodiment, the historical data transmission rate may alternatively refer to a ratio of the size of the target data transmitted in the data synchronization process to the data transmission time. The historical data request moment may refer to the moment at which the target node requests to download the target data from the $i^{th}$ adjacent node during the historical data synchronization process. In this embodiment, the historical data request moment is mainly used for measuring a time length between the moment at which the selection weight value of the $i^{th}$ adjacent node is calculated and the historical data request moment at which the target node and the $i^{th}$ adjacent node perform historical data synchronization for the $j^{th}$ time. The time length can measure frequency of data synchronization between the target node and the $i^{th}$ adjacent node, that is, a shorter time length indicates more frequent data synchronization between the target node and the $i^{th}$ adjacent node.

In a specific implementation of one embodiment, a sum of the average value of the data transmission rates between the target node and the $i^{th}$ adjacent node in the last 5 historical data synchronization processes and the average value of the time lengths between the moment at which the selection weight value of the $i^{th}$ adjacent node is calculated and the historical data request moment at which the target node and the $i^{th}$ adjacent node perform historical data synchronization in the last 5 times may be required to serve as the selection weight value of the adjacent node. As shown in Table 2 below, the data transmission rates of the target node and the $i^{th}$ adjacent node in the last 5 historical data synchronization processes are: 10 Mb/s, 30 Mb/s, 20 Mb/s, 15 Mb/s, and 25 Mb/s. The moments when the target node requests to download the target data from the $i^{th}$ adjacent node historically in the last 5 times are: 12:00:00 on Jul. 1, 2019, 12:00:10 on Jul. 1, 2019, 12:00:20 on Jul. 1, 2019, 12:00:30 on Jul. 1, 2019, and 12:00:40 on Jul. 1, 2019.

TABLE 2

| j | $S_j$ | $t_j$ |
|---|---|---|
| m + 5 | 10 Mb/s | 12:00:00 on Jul. 1, 2019 |
| m + 4 | 30 Mb/s | 12:00:10 on Jul. 1, 2019 |
| m + 3 | 20 Mb/s | 12:00:20 on Jul. 1, 2019 |
| m + 2 | 15 Mb/s | 12:00:30 on Jul. 1, 2019 |
| m + 1 | 25 Mb/s | 12:00:40 on Jul. 1, 2019 |

If the moment t when the selection weight value of the $i^{th}$ adjacent node is calculated is 12:00:50 on Jul. 1, 2019, the selection weight value of the adjacent node calculated by the calculation formula of this embodiment is: $W_i=50$.

According to the foregoing embodiment, by calculating an average data transmission rate of the adjacent node in the last n times of historical data synchronization to serve as a factor in determining the selection weight value, the data synchronization efficiency of the adjacent node can be well measured. However, if a data transmission rate of an adjacent node is too high, other nodes will always select this adjacent node as the target adjacent node, which will cause the node to be overloaded and reduce the data synchronization efficiency. For an adjacent node with a higher data transmission rate, the adjacent node is selected as the target adjacent node more frequently. Furthermore, the time length between the moment at which the selection weight value of the adjacent node is calculated and the historical data request moment at which the target node and the adjacent node perform historical data synchronization for the $j^{th}$ time will be shorter. Based on this, the historical data request moment at which the target node requests to synchronize data with the adjacent node is used as another factor in determining the selection weight value, which can balance the adjacent node resources connected to the target node in the distributed system, to avoid a case that an adjacent node is overused to cause the adjacent node to be overloaded. Based on the above embodiment, a better adjacent node can be selected.

The manner of the determining the selection weight value of the adjacent node according to the historical data synchronization information described above is merely one example embodiment. There may be more or fewer operations and those operations may be different from those examples described above.

About step 230: Select, according to the selection weight values of the adjacent nodes, a target adjacent node for synchronizing data to the target node, and synchronize target data in the target adjacent node to the target node.

Figure 5:
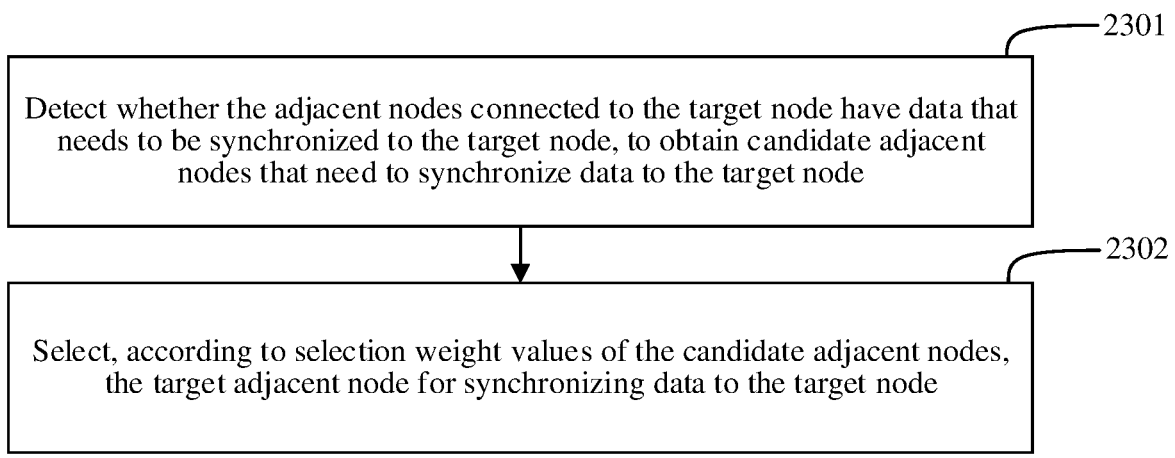
FIG. 5 is a detailed flowchart of step 230 shown in FIG. 2 according to an embodiment of this application.

In an exemplary embodiment, the selecting, according to the selection weight values of the adjacent nodes, a target adjacent node for synchronizing data to the target node may include steps as shown in FIG. 5.

FIG. 5 is a detailed flowchart of step 230 according to the embodiments of this application, including the following steps in one embodiment:

Step 2301: Detect whether the adjacent nodes connected to the target node have data that needs to be synchronized to the target node, to obtain candidate adjacent nodes that need to synchronize data to the target node.

In a specific implementation of one embodiment, the distributed system may include a blockchain system, and the target data may include block data. The detecting whether the adjacent nodes connected to the target node have data that needs to be synchronized to the target node may be implemented in the following manner:

A height of a first block header of a blockchain ledger in the target node and a height of a second block header of the blockchain ledger in the adjacent nodes connected to the target node are obtained separately. Then, the height of the first block header is compared with the height of the second block header to detect whether the adjacent nodes connected to the target node have data that needs to be synchronized to the target node. If the height of the second block header is greater than the height of the first block header, it indicates that there is block data that needs to be synchronized to the target node in the adjacent nodes connected to the target node, and the adjacent node with block data that needs to be synchronized to the target node is used as the candidate adjacent node.

Step 2302: Select, according to selection weight values of the candidate adjacent nodes, the target adjacent node for synchronizing data to the target node.

In a specific implementation of one embodiment, the selecting, according to selection weight values of the candidate adjacent nodes, the target adjacent node for synchronizing data to the target node may be implemented in the following manner:

According to the selection weight values of the candidate adjacent nodes, the candidate adjacent nodes are sorted in descending order, and the adjacent node with the largest selection weight value is used as the target adjacent node.

According to the foregoing embodiment, by detecting whether the adjacent nodes connected to the target node have data that needs to be synchronized to the target node to obtain candidate adjacent nodes that need to synchronize data to the target node, a case that some selected target adjacent nodes have a data synchronization failure due to incomplete data can be avoided, thereby reducing the waste of computer network resources.

In an exemplary embodiment, the distributed system may include a blockchain system, and the target data may include complete block data. The selecting, according to the selection weight values of the adjacent nodes, a target adjacent node for synchronizing data to the target node and synchronizing target data in the target adjacent node to the target node may be implemented in the following manner:

selecting, according to the selection weight values of the adjacent nodes, a second target adjacent node for synchronizing the complete block data to the target node, and synchronizing the complete block data from the second target adjacent node.

In an exemplary embodiment, the distributed system may include a blockchain system, and the target data may include block header data and complete block data. The selecting, according to the selection weight values of the adjacent nodes, a target adjacent node for synchronizing data to the target node and synchronizing target data in the target adjacent node to the target node may be implemented in the following manner:

selecting, according to the selection weight values of the adjacent nodes, a first target adjacent node for synchronizing the block header data to the target node, and synchronizing the block header data from the first target adjacent node; and selecting, according to the selection weight values of the adjacent nodes after the block header data is synchronized, a second target adjacent node for synchronizing the complete block data to the target node, and synchronizing the complete block data from the second target adjacent node.

In a specific implementation of one embodiment, before the selecting a second target adjacent node for synchronizing the complete block data to the target node, the following steps can be further implemented:

obtaining a height of a third block header with the complete block data of a blockchain ledger in the target node;

obtaining a height of a fourth block header of the blockchain ledger in the target node; and comparing the height of the third block header with the height of the fourth block header to detect whether the target node needs to select the second target adjacent node for synchronizing the complete block data to the target node, where in a case that the height of the third block header is smaller than the height of the fourth block header, it indicates that the target node needs to select the second target adjacent node for synchronizing the complete block data to the target node.

In the blockchain ledger in the target node, there are blocks with complete block data and blocks without the complete block data. A block with the complete block data includes a block header and a block body, while a block without the complete block data only includes a block header. Therefore, in this specific embodiment, the height of the third block header refers to the height of a block header of a block with the complete block data, and the height of the fourth block header refers to the height of a block header of a block without the complete block data. When the height of the block header of the block with the complete block data is less than the height of the block header of the block without the complete block data, it indicates that there are blocks without the complete block data in the target node, which further indicates that the target node needs to select a second target adjacent node for synchronizing the complete block data to the target node.

Figure 6:
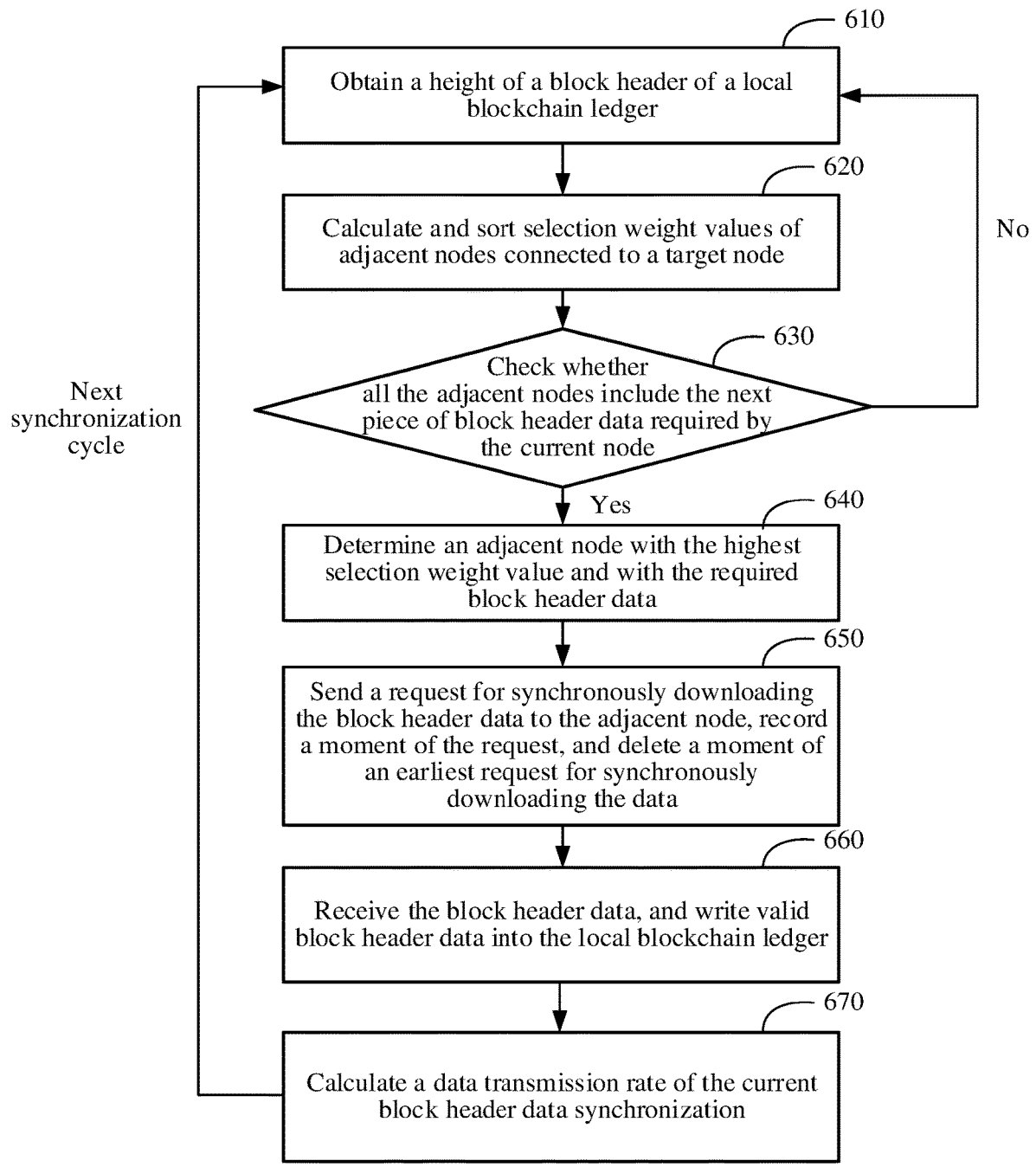
FIG. 6 is a detailed flowchart of block header data synchronization according to an embodiment of this application.

Taking the distributed system being a blockchain system as an example, a data synchronization solution in an embodiment of this application is described in detail below. In this embodiment, a process of synchronizing block data including processes of synchronizing block header data and synchronizing complete block data is taken as an example for description:

In a specific implementation of one embodiment, the specific implementation of the target node synchronizing block header data can be implemented cyclically according to a process shown in FIG. 6, and the process specifically includes the following steps:

Step 610: Obtain a height of a block header of a local blockchain ledger.

Step 620: Calculate and sort selection weight values of adjacent nodes connected to a target node.

Step 630: Check whether all the adjacent nodes include the next piece of block header data required by the current node. If yes, step 640 is performed; and if not, step 610 is performed to perform the next synchronization cycle.

Step 640: Determine an adjacent node with the highest selection weight value and with the required block header data.

Step 650: Send a request for synchronously downloading the block header data to the adjacent node, record a moment of the request, and delete a moment of an earliest request for synchronously downloading the data.

Step 660: Receive the block header data, and write valid block header data into the local blockchain ledger.

Step 670: Calculate a data transmission rate of the current block header data synchronization.

To make it easier for those skilled in the art to understand step 650 described above, a specific example is used for further clarity. For example, before the sending a request for synchronously downloading the block header data to the adjacent node, there have been three historical request records of sending the request for synchronously downloading the block header data to the adjacent node, and request moments of the three request records are 12:00:00 on Jul. 1, 2019, 12:01:01 on Jul. 1, 2019, and 12:02:01 on Jul. 1, 2019, where 12:00:00 on Jul. 1, 2019 is the earliest request moment of sending the request for synchronously downloading the block header data to the adjacent node. When the request for synchronously downloading the block header data is sent to the adjacent node again at 12:03:01 on Jul. 1, 2019, this moment is recorded, that is, 12:03:01 on Jul. 1, 2019 is recorded, and the earliest request moment of sending the request for synchronously downloading the block header data to the adjacent node is deleted, that is, 12:00:00 on Jul. 1, 2019 is deleted. The last three request moments of sending the request for synchronously downloading the block header data to the adjacent node that are finally recorded are: 12:01:01 on Jul. 1, 2019, 12:02:01 on Jul. 1, 2019, and 12:03:01 on Jul. 1, 2019.

Figure 7:
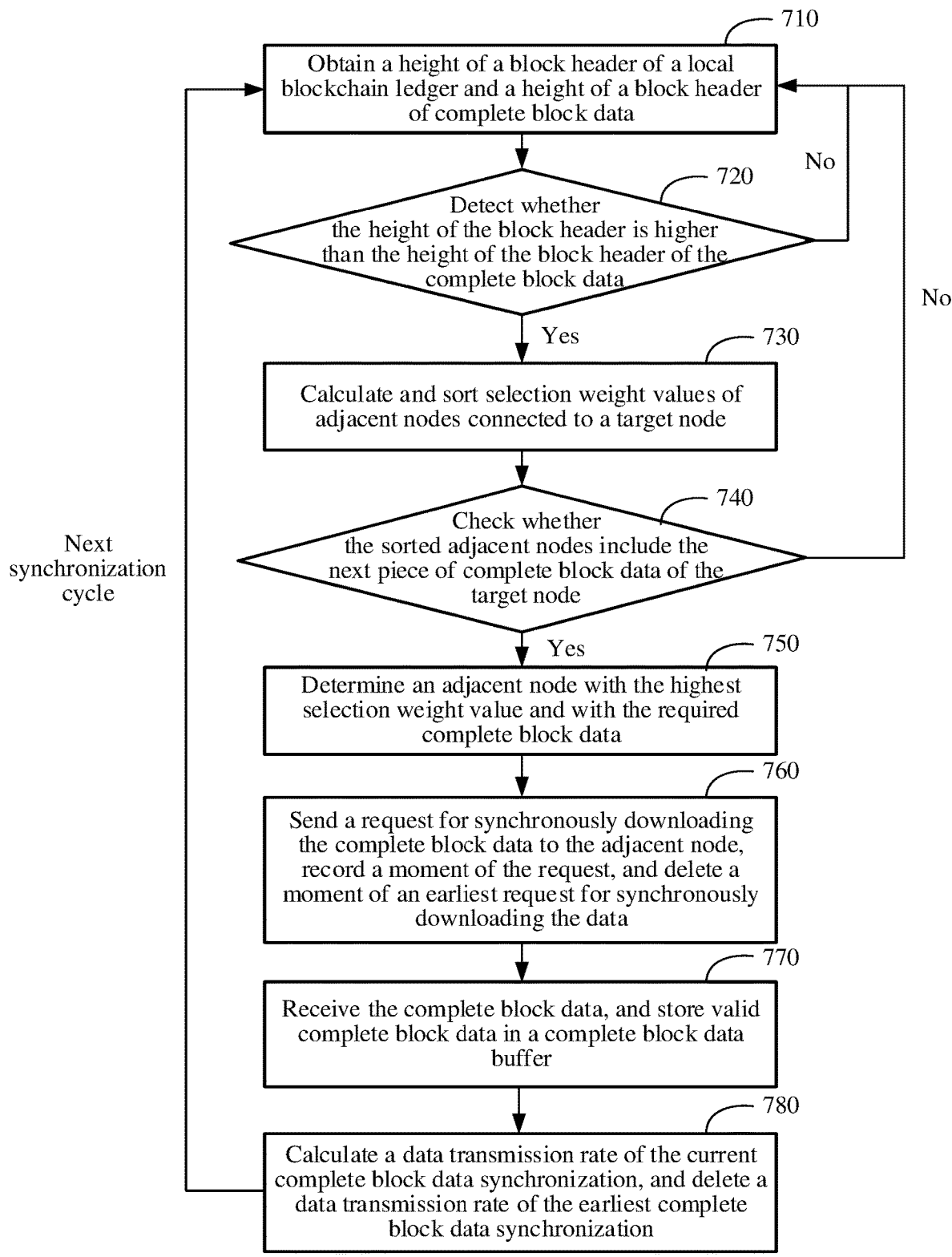
FIG. 7 is a detailed flowchart of complete block data synchronization according to an embodiment of this application.

In a specific implementation of one embodiment, the specific implementation of the target node synchronizing complete block data can be implemented cyclically according to a process shown in FIG. 7, and the process includes the following steps in one embodiment:

Step 710: Obtain a height of a block header of a local blockchain ledger and a height of a block header of complete block data.

Step 720: Detect whether the height of the block header is higher than the height of the block header of the complete block data. If yes, step 730 is performed; and if not, step 710 is performed to perform the next synchronization cycle.

Step 730: Calculate and sort selection weight values of adjacent nodes connected to a target node.

Step 740: Check whether the sorted adjacent nodes include the next piece of complete block data of the target node. If yes, step 750 is performed; and if not, step 710 is performed to perform the next synchronization cycle.

Step 750: Determine an adjacent node with the highest selection weight value and with the required complete block data.

Step 760: Send a request for synchronously downloading the complete block data to the adjacent node, record a moment of the request, and delete a moment of an earliest request for synchronously downloading the data.

Step 770: Receive the complete block data, and store valid complete block data in a complete block data buffer.

Step 780: Calculate a data transmission rate of the current complete block data synchronization, and delete a data transmission rate of the earliest complete block data synchronization.

To make it easier for those skilled in the art to understand step 760 described above, a specific example is used for description. For example, before the sending a request for synchronously downloading the complete block data to the adjacent node, there have been three historical request records of sending the request for synchronously downloading the complete block data to the adjacent node, and request moments of the three request records are 12:00:00 on Jul. 1, 2019, 12:01:01 on Jul. 1, 2019, and 12:02:01 on Jul. 1, 2019, where 12:00:00 on Jul. 1, 2019 is the earliest request moment of sending the request for synchronously downloading the complete block data to the adjacent node. When the request for synchronously downloading the complete block data is sent to the adjacent node again at 12:03:01 on Jul. 1, 2019, this moment is recorded, that is, 12:03:01 on Jul. 1, 2019 is recorded, and the earliest request moment of sending the request for synchronously downloading the complete block data to the adjacent node is deleted, that is, 12:00:00 on Jul. 1, 2019 is deleted. The last three request moments of sending the request for synchronously downloading the complete block data to the adjacent node that are finally recorded are: 12:01:01 on Jul. 1, 2019, 12:02:01 on Jul. 1, 2019, and 12:03:01 on Jul. 1, 2019.

In the above embodiment, the advantages of synchronizing the block header data before synchronizing the complete block data lie in two aspects. For one aspect, due to the relatively large data volume and high security requirements of the complete block data, when the complete block data of a target node newly added to the blockchain system is synchronized, it is particularly common to see a long data synchronization time and rejection of a data synchronization request. However, the relatively small data volume and non-high security requirements of the block header data are particularly suitable for data synchronization of the target node newly added to the blockchain system. For the other aspect, the target node first synchronizes the block header data, which is helpful for detecting whether the target node needs to select the target adjacent node for synchronizing the complete block data to the target node. When it is detected that the target node does not need to select the target adjacent node for synchronizing the complete block data to the target node, the target node does not need to calculate the selection weight values of the adjacent nodes, thereby saving computer resources.

In a specific implementation of one embodiment, the synchronizing the complete block data from the second target adjacent node can be implemented in the following manner:

downloading the complete block data in the second target adjacent node; verifying validity of the complete block data; and adding valid complete block data to a block data buffer of the target node and synchronizing the complete block data to the target node according to the data stored in the block data buffer.

In a specific implementation of one embodiment, the synchronizing the complete block data to the target node according to the data stored in the block data buffer can be implemented in the following manner:

reading, according to a block sequence indicated by a blockchain ledger in the target node, corresponding block data from the block data buffer and writing the corresponding block data into the blockchain ledger in the target node.

In an exemplary embodiment, the synchronizing target data in the target adjacent node to the target node can be implemented in the following manner:

transmitting a download request for the target data to the target adjacent node, to cause the target adjacent node to transmit the target data to the target node according to the download request.

In a specific implementation of one embodiment, in the process of synchronizing target data in the target adjacent node to the target node, in a case that synchronization of the target data fails, an error count in the data synchronization between the target node and the target adjacent node is recorded.

The target data synchronization failure may refer to timeout of a data synchronization request, data abnormalities during a synchronous download process, or a failure of access to a target adjacent node.

In a specific implementation of one embodiment, in the process of synchronizing target data in the target adjacent node to the target node, in a case that synchronization of the target data succeeds, a data transmission rate and a data request moment in the data synchronization between the target node and the target adjacent node are recorded.

The manner of selecting, according to the selection weight values of the adjacent nodes, a target adjacent node for synchronizing data to the target node and synchronizing target data in the target adjacent node to the target node described above is merely one example embodiment. There may be more or fewer operations and those operations may be different from those examples described above.

In summary, in the technical solution of the embodiments of this application, according to historical data synchronization information of adjacent nodes connected to a target node, a selection weight value that can reflect synchronization efficiency of the adjacent nodes synchronizing data to the target node is determined for each adjacent node, and a target adjacent node that can synchronize data to the target node is finally determined according to selection weight values corresponding to different adjacent nodes. Therefore, a relatively appropriate adjacent node can be selected for data synchronization by comprehensively considering the historical data synchronization information of the nodes. For example, a relatively scientific and proper target adjacent node can be selected by considering information such as actual congestion and load conditions of the nodes, thereby shortening the time of data synchronization in the distributed system and improve synchronization efficiency. Furthermore, the technical problems of slow data synchronization and low data synchronization efficiency of nodes in the distributed system existing in the related art can be solved.

The following describes apparatus example embodiments of this application, which can be used to implement the data synchronization method of a distributed system in the foregoing embodiments of this application. There may be more or fewer modules and operations of those modules may be different from the examples described below, and may include any of the operations described above. For details not disclosed in the apparatus embodiments of this application, reference may be made to the foregoing embodiments of the data synchronization method of a distributed system in this application.

Figure 8:
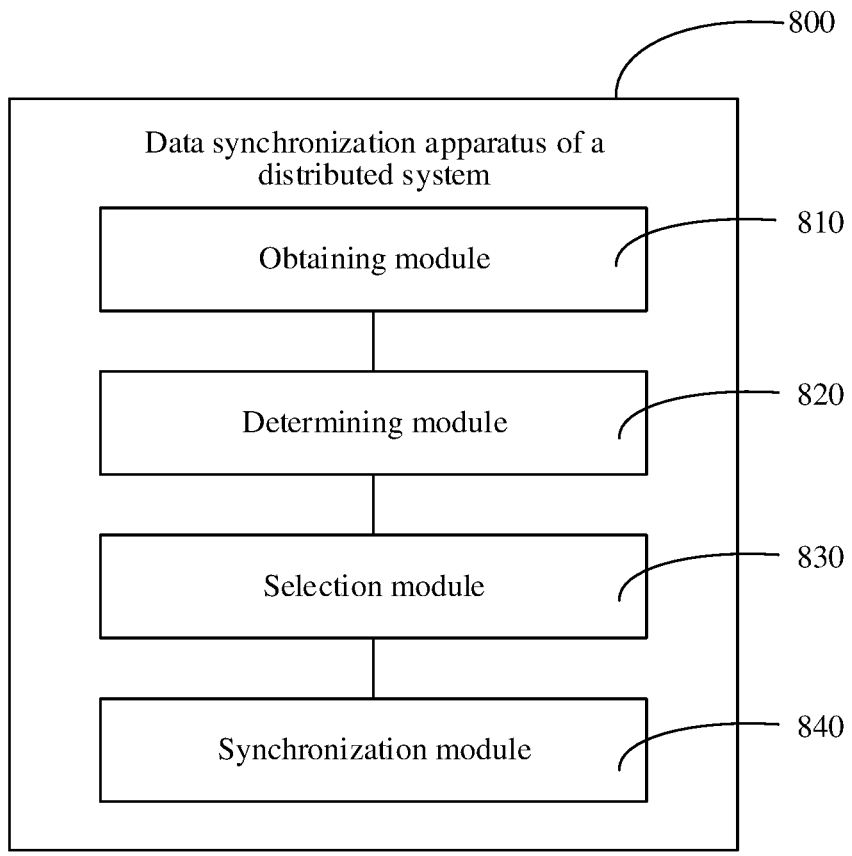
FIG. 8 is a block diagram of a data synchronization apparatus of a distributed system according to an embodiment of this application.

FIG. 8 is a block diagram of a data synchronization apparatus of a distributed system according to an embodiment of this application.

Referring to FIG. 8, a data synchronization apparatus 800 of a distributed system according to an embodiment of this application includes: an obtaining module 810, a determining module 820, a selection module 830 and a synchronization module 840.

The obtaining module 810 is configured to obtain historical data synchronization information of adjacent nodes connected to a target node; the determining module 820 is configured to determine selection weight values of the adjacent nodes according to the historical data synchronization information, the selection weight values being used for measuring efficiency of the adjacent nodes synchronizing data to the target node; the selection module 830 is configured to select, according to the selection weight values of the adjacent nodes, a target adjacent node for synchronizing data to the target node; and the synchronization module 840 is configured to synchronize target data in the target adjacent node to the target node.

In some embodiments of this application, based on the foregoing solution, the selection module 830 is configured to: detect whether the adjacent nodes connected to the target node have data that needs to be synchronized to the target node, to obtain candidate adjacent nodes that need to synchronize data to the target node; and select, according to selection weight values of the candidate adjacent nodes, the target adjacent node for synchronizing data to the target node.

In some embodiments of this application, based on the foregoing solution, the obtaining module 810 includes: a detection module, configured to detect whether the adjacent nodes connected to the target node have data that needs to be synchronized to the target node, to obtain candidate adjacent nodes that need to synchronize data to the target node; and an execution module, configured to obtain historical data synchronization information of the candidate adjacent nodes.

In some embodiments of this application, based on the foregoing solution, the distributed system includes a blockchain system, the target data includes block data, and the detection module is configured to: obtain a height of a first block header of a blockchain ledger in the target node; obtain a height of a second block header of the blockchain ledger in the adjacent nodes connected to the target node; and compare the height of the first block header with the height of the second block header to detect whether the adjacent nodes connected to the target node have data that needs to be synchronized to the target node.

In some embodiments of this application, based on the foregoing solution, the historical data synchronization information includes error counts of the target node and the adjacent nodes in a historical data synchronization process, and the determining module 820 is configured to: detect adjacent nodes having error counts not exceeding an error count threshold; and determine, according to the historical data synchronization information, selection weight values of the adjacent nodes having the error counts not exceeding the error count threshold.

In some embodiments of this application, based on the foregoing solution, the historical data synchronization information includes a historical data transmission rate and a historical data request moment, and the determining module 820 is configured to calculate the selection weight values of the adjacent nodes by the following formula:

$$W_i = \frac{\sum_{j=m+1}^{j=m+n} S_j + \sum_{j=m+1}^{j=m+n} (t - t_j)}{n}$$

where $W_i$ represents the selection weight value of the $i^{th}$ adjacent node; j represents the historical data synchronization between the target node and the $i^{th}$ adjacent node for the $j^{th}$ time; m represents the historical data synchronization between the target node and the $i^{th}$ adjacent node for the $m^{th}$ time; n represents the number of times of the historical data synchronization between the target node and the $i^{th}$ adjacent node in the last n times; $S_j$ represents the historical data transmission rate in a case that the target node and the $i^{th}$ adjacent node perform historical data synchronization for the $j^{th}$ time; $t_j$ represents the historical data request moment at which the target node and the $i^{th}$ adjacent node perform the historical data synchronization for the $j^{th}$ time; and t represents the moment at which the selection weight value of the $i^{th}$ adjacent node is calculated.

In some embodiments of this application, based on the foregoing solution, the synchronization module 840 is configured to: transmit a download request for the target data to the target adjacent node, to cause the target adjacent node to transmit the target data to the target node according to the download request; and the method further includes: in the process of synchronizing target data in the target adjacent node to the target node, in a case that synchronization of the target data fails, recording an error count in the data synchronization between the target node and the target adjacent node.

In some embodiments of this application, based on the foregoing solution, the distributed system includes a blockchain system, the target data includes complete block data, and the selection module 830 is configured to: select, according to the selection weight values of the adjacent nodes, a second target adjacent node for synchronizing the complete block data to the target node; and the synchronization module 840 is configured to synchronize the complete block data from the second target adjacent node.

In some embodiments of this application, based on the foregoing solution, the distributed system includes a blockchain system, the target data includes block header data and complete block data, and the selection module 830 is configured to: select, according to the selection weight values of the adjacent nodes, a first target adjacent node for synchronizing the block header data to the target node; and the synchronization module 840 is configured to synchronize the block header data from the first target adjacent node; and the selection module 830 is further configured to select, according to the selection weight values of the adjacent nodes after the block header data is synchronized, a second target adjacent node for synchronizing the complete block data to the target node; and the synchronization module 840 is further configured to synchronize the complete block data from the second target adjacent node.

In some embodiments of this application, based on the foregoing solution, the distributed system includes a blockchain system, the target data includes complete block data, and the selection module 830 is configured to: obtain, before selecting the second target adjacent node for synchronizing the complete block data to the target node, a height of a third block header with the complete block data of a blockchain ledger in the target node; obtain a height of a fourth block header of the blockchain ledger in the target node; and compare the height of the third block header with the height of the fourth block header to detect whether it is necessary to select the second target adjacent node for synchronizing the complete block data to the target node.

In some embodiments of this application, based on the foregoing solution, the distributed system includes a blockchain system, the target data includes complete block data, and the synchronization module 840 is configured to: download the complete block data in the second target adjacent node; verify validity of the complete block data; and add valid complete block data to a block data buffer of the target node and synchronize the complete block data to the target node according to the data stored in the block data buffer.

In some embodiments of this application, based on the foregoing solution, the distributed system includes a blockchain system, the target data includes complete block data, and the synchronization module 840 is configured to: read, according to a block sequence indicated by a blockchain ledger in the target node, corresponding block data from the block data buffer and write the corresponding block data into the blockchain ledger in the target node.

Although the data synchronization method of a distributed system and several modules of the data synchronization apparatus of a distributed system are mentioned in the above detailed description, this division is not mandatory. In fact, the functions of two or more modules described above may be embodied in one module according to the implementations of this application. Conversely, the features or functions of one module described above may be further divided and embodied by a plurality of modules. The components shown as modules may or may not be physical units, may be located in one position, or may be distributed on a plurality of network units. Some of or all of the modules may be selected according to actual needs for achieving the objectives of the solutions of this application. A person of ordinary skill in the art may understand and implement the embodiments based on this description.

According to another aspect, this application further provides a computer-readable storage medium, on which a program product capable of implementing the foregoing method of this specification is stored. In some possible implementations, each aspect of this application may be further implemented in a form of a program product including a program code. When the program product runs on a terminal device, the program code is used to enable the terminal device to perform steps according to the various exemplary implementations of this application described in the foregoing part of the "exemplary method" of the specification.

Figure 9:
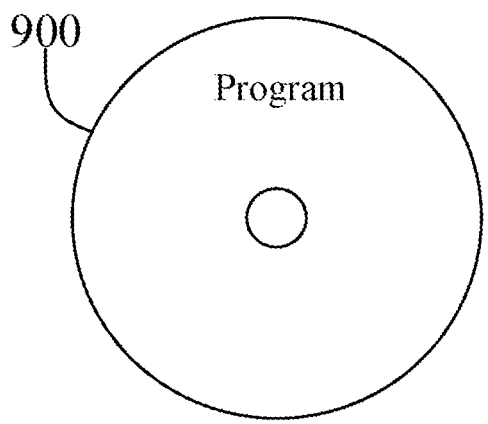
FIG. 9 shows a computer-readable storage medium for implementing the foregoing method according to an embodiment of this application.

FIG. 9 describes a program product 900 configured to implement the foregoing methods according to the implementations of this application, and the program product may use a portable compact disk read-only memory (CD-ROM) and includes program code, and may run on a terminal device such as a personal computer. However, the program product of this application is not limited to this. In this specification, the readable storage medium may be any tangible medium including or storing a program, and the program may be used by or in combination with an instruction execution system, apparatus, or device.

The program product may use any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples (non-exhaustive list) of the readable storage medium may include: an electrical connection having one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof.

The computer-readable signal medium may include a data signal transmitted in a baseband or as part of a carrier, and stores readable program code. The propagated data signal may be in a plurality of forms, including, but not limited to, an electromagnetic signal, an optical signal, or any appropriate combination thereof. The readable signal medium may alternatively be any readable medium other than the readable storage medium. The readable medium may be configured to send, propagate, or transmit a program configured to be used by or in combination with an instruction execution system, apparatus, or device.

The program code included in the readable medium may be transmitted by using any suitable medium, including but not limited to, via wireless transmission, a wire, a cable, radio frequency (RF) or the like, or any suitable combination of thereof.

The program code used for executing the operations of this application may be written by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on user equipment, executed as an independent software package, partially executed on a user computing device and partially executed on a remote computing device, or completely executed on a remote computing device or server. For the case involving a remote computing device, the remote computing device may be connected to a user computing device through any type of network including a local area network (LAN) or a wide area network (WAN), or may be connected to an external computing device (for example, through the Internet by using an Internet service provider).

According to another aspect, this application further provides an electronic device capable of implementing the foregoing method.

A person skilled in the art can understand that various aspects of this application may be implemented as systems, methods, or computer program products. Therefore, each aspect of this application may be specifically implemented in the following forms, that is, the implementation form of complete hardware, complete software (including firmware and micro code), or a combination of hardware and software, which may be uniformly referred to as "circuit", "module", or "system" herein.

Figure 10:
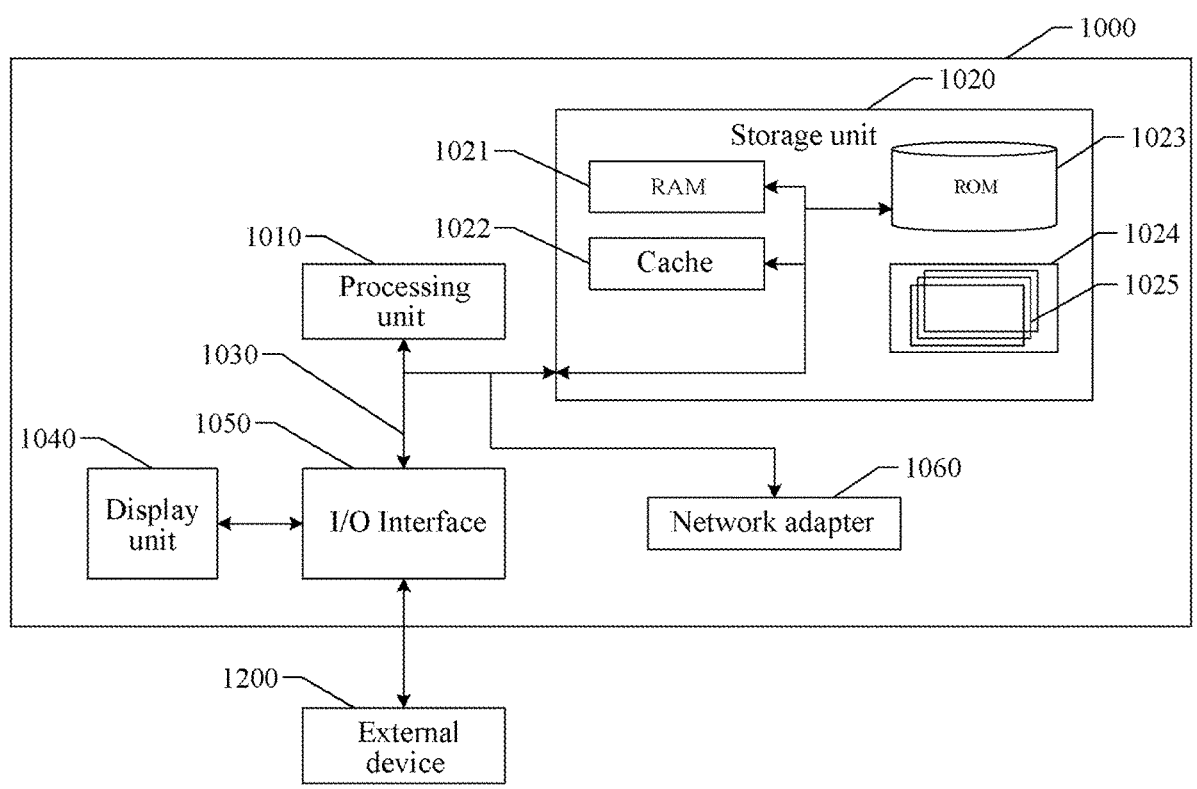
FIG. 10 is a block diagram of an example of an electronic device for implementing the foregoing method according to an embodiment of this application.

An electronic device 1000 according to this implementation of this application is described below with reference to FIG. 10. The electronic device 1000 shown in FIG. 10 is only an example, and does not impose any restriction on functions and scopes of use of the embodiments of this application. The electronic device 1000 may be any of the components or elements described above, including but not limited to any of the nodes and/or the modules.

As shown in FIG. 10, the electronic device 1000 is represented in a form of a computing device. Components of the electronic device 1000 may include, but are not limited to: at least one processing unit 1010, at least one storage unit 1020, and a bus 1030 connecting different system components (including the storage unit 1020 and the processing unit 1010).

The storage unit stores program code, and the program code may be executed by the processing unit 1010, so that the processing unit 1010 performs the steps according to various exemplary implementations of this application described in the foregoing "method embodiments" of this specification.

The storage unit 1020 may include a readable medium in the form of a volatile storage unit, for example, a random access memory (RAM) 1021 and/or a cache storage unit 1022, and may further include a read-only storage unit (ROM) 1023.

The storage unit 1020 may further include a program/utility 1024 having a group of (at least one) program modules 1025. Such a program module 1025 includes, but is not limited to, an operating system, one or more application programs, other program modules, and program data. Each or a combination of these examples may include implementation of a network environment.

The bus 1030 may indicate one or more of several types of bus structures, including a storage unit bus or storage unit controller, a peripheral bus, an accelerated graphics port, a processing unit, or a local bus using any of a plurality of bus structures.

The electronic device 1000 may alternatively communicate with one or more external devices 1200 (such as a keyboard, a pointing device, and a Bluetooth device), may alternatively communicate with a plurality of devices that enable a user to interact with the electronic device 1000, and/or communicate with any device (such as router or a modem) that enables the electronic device 1000 to communicate with one or more other computing devices. Such communication may be performed through an input/output (I/O) interface 1050. In addition, the electronic device 1000 may further communicate with one or more networks such as a local area network (LAN), a wide area network (WAN), and/or a public network (such as the Internet) through a network adapter 1060. As shown in the figure, the network adapter 1060 communicates with other modules of the electronic device 1000 through the bus 1030. It is to be understood that although not shown in the figure, other hardware and/or software modules may be used in combination with the electronic device 1000, including, but not limited to microcode, a device driver, a redundancy processing unit, an external disk drive array, a RAID system, a tape drive, a data backup storage system, or the like.

Through descriptions of the foregoing implementations, it is easy for a person skilled in the art to understand that the exemplary implementations described herein can be implemented by software or by combining software with necessary hardware. Therefore, the technical solutions of the implementations of this application may be implemented in the form of a software product. The software product may be stored in a non-volatile storage medium (which may be a CD-ROM, a USB flash drive, a removable hard disk, or the like) or in a network and includes several instructions for instructing a computer device (which may be a personal computer, a server, a terminal device, a network device, or the like) to perform the methods described in the implementations of this application.

In addition, the foregoing accompanying drawings are only schematic illustrations of the processing included in the method according to the exemplary embodiments of this application, and are not intended for limitation. It is easily understood that the processes illustrated in the foregoing accompanying drawings do not indicate or define the chronological order of these processes. In addition, it is also easily understood that these processes may be performed, for example, synchronously or asynchronously in a plurality of modules.

It is to be understood that this application is not limited to the precise structures described above and shown in the accompanying drawings, and various modifications and changes may be made without departing from the scope of this application. The scope of this application is described by the appended claims.

What is claimed is:

1. A data synchronization method of a distributed system, performed by an electronic device, the distributed system comprising a plurality of nodes, and the data synchronization method comprising:
    obtaining historical data synchronization information of adjacent nodes connected to a target node, wherein the historical data synchronization information comprises a historic error count rate for the adjacent nodes or a historic data transmission rate for the adjacent nodes;
    determining selection weight values for each of the adjacent nodes according to the historical data synchronization information, the selection weight values being used for measuring efficiency of the adjacent nodes synchronizing data to the target node, wherein the determining selection weight values for each of the adjacent nodes according to the historical data synchronization information comprises:
        detecting adjacent nodes having error counts not exceeding an error count threshold; and
        determining, according to the historical data synchronization information, selection weight values of the adjacent nodes having the error counts not exceeding the error count threshold;
    selecting, according to the selection weight values of the adjacent nodes, a target adjacent node for synchronizing data to the target node; and
    synchronizing target data from the target adjacent node with the target node.

2. The method according to claim 1, wherein the selecting, according to the selection weight values of the adjacent nodes, a target adjacent node for synchronizing data to the target node further comprises:
    detecting whether the adjacent nodes connected to the target node have data that needs to be synchronized to the target node, to obtain candidate adjacent nodes that need to synchronize data to the target node; and
    selecting, according to the selection weight values of the candidate adjacent nodes, the target adjacent node from among the candidate adjacent nodes for synchronizing data to the target node.

3. The method according to claim 2, wherein the selecting, according to selection weight values of the candidate adjacent nodes, the target adjacent node from among the candidate adjacent nodes for synchronizing data to the target node comprises:
    determining a candidate adjacent node from the candidate adjacent nodes with the highest selection weight value as the target adjacent node.

4. The method according to claim 1, wherein the obtaining historical data synchronization information of adjacent nodes connected to a target node comprises:
    detecting whether the adjacent nodes connected to the target node have data that needs to be synchronized to the target node, to obtain candidate adjacent nodes that need to synchronize data to the target node; and
    obtaining historical data synchronization information of the candidate adjacent nodes.

5. The method according to claim 4, wherein the distributed system comprises a blockchain system, the target data comprises block data, and the detecting whether the adjacent nodes connected to the target node have data that needs to be synchronized to the target node comprises:
    obtaining a height of a first block header of a blockchain ledger in the target node;
    obtaining a height of a second block header of the blockchain ledger in the adjacent nodes connected to the target node; and
    comparing the height of the first block header with the height of the second block header to detect whether the adjacent nodes connected to the target node have data that needs to be synchronized to the target node.

6. The method according to claim 1, wherein the historical data synchronization information comprises error counts of the target node and the adjacent nodes, and the determining selection weight values for each of the adjacent nodes according to the historical data synchronization information comprises:
    detecting adjacent nodes having error counts not exceeding an error count threshold; and
    determining, according to the historical data synchronization information, selection weight values of the adjacent nodes having the error counts not exceeding the error count threshold.

7. The method according to claim 1, wherein the historical data synchronization information comprises a historical data transmission rate and a historical data request moment, and the determining selection weight values for each of the adjacent nodes according to the historical data synchronization information comprises: the selection weight values of the adjacent nodes are calculated by the following formula:

$$W_i = \frac{\sum_{j=m+1}^{j=m+n} S_j + \sum_{j=m+1}^{j=m+n} (t - t_j)}{n}$$

wherein $W_i$ represents the selection weight value of the $i^{th}$ adjacent node; j represents the historical data synchronization between the target node and the $i^{th}$ adjacent node for the $j^{th}$ time; m represents the historical data synchronization between the target node and the $i^{th}$ adjacent node for the $M^{th}$ time; n represents the number of times of the historical data synchronization between the target node and the $i^{th}$ adjacent node in the last n times; $S_j$ represents the historical data transmission rate when the target node and the $i^{th}$ adjacent node perform historical data synchronization for the $j^{th}$ time; $t_j$ represents the historical data request moment at which the target node and the $i^{th}$ adjacent node perform the historical data synchronization for the $j^{th}$ time; and t represents the moment at which the selection weight value of the $i^{th}$ adjacent node is calculated.

8. The method according to claim 1, wherein the synchronizing target data in the target adjacent node to the target node comprises:
   transmitting a download request for the target data to the target adjacent node, to cause the target adjacent node to transmit the target data to the target node according to the download request; and
   in the process of synchronizing target data in the target adjacent node to the target node, when synchronization of the target data fails, recording an error count in the data synchronization between the target node and the target adjacent node.

9. The method according to claim 1, wherein the distributed system comprises a blockchain system, the target data comprises block header data and complete block data, and the selecting, according to the selection weight values of the adjacent nodes, a target adjacent node for synchronizing data to the target node, and synchronizing target data in the target adjacent node to the target node comprises:
   selecting, according to the selection weight values of the adjacent nodes, a first target adjacent node for synchronizing the block header data to the target node, and synchronizing the block header data from the first target adjacent node; and
   selecting, according to the selection weight values of the adjacent nodes after the block header data is synchronized, a second target adjacent node for synchronizing the complete block data to the target node, and synchronizing the complete block data from the second target adjacent node.

10. The method according to claim 9, wherein before the selecting a second target adjacent node for synchronizing the complete block data to the target node, the method further comprising:
    obtaining a height of a third block header with the complete block data of a blockchain ledger in the target node;
    obtaining a height of a fourth block header of the blockchain ledger in the target node; and
    comparing the height of the third block header with the height of the fourth block header to detect whether to select the second target adjacent node for synchronizing the complete block data to the target node.

11. The method according to claim 10, the comparing the height of the third block header with the height of the fourth block header to detect whether to select the second target adjacent node for synchronizing the complete block data to the target node comprising:
    selecting the second target adjacent node for synchronizing the complete block data to the target node when the height of the third block header is smaller than the height of the fourth block header.

12. The method according to claim 1, wherein the distributed system comprises a blockchain system, the target data comprises complete block data, and the selecting, according to the selection weight values of the adjacent nodes, a target adjacent node for synchronizing data to the target node, and synchronizing target data in the target adjacent node to the target node comprises:
    selecting, according to the selection weight values of the adjacent nodes, a second target adjacent node for synchronizing the complete block data to the target node, and synchronizing the complete block data from the second target adjacent node.

13. The method according to claim 9, the synchronizing the complete block data from the second target adjacent node comprising:
    downloading the complete block data in the second target adjacent node;
    verifying validity of the complete block data; and
    adding valid complete block data to a block data buffer of the target node and synchronizing the complete block data to the target node according to the data stored in the block data buffer.

14. The method according to claim 13, the synchronizing the complete block data to the target node according to the data stored in the block data buffer comprising:
    reading, according to a block sequence indicated by a blockchain ledger in the target node, corresponding block data from the block data buffer and writing the corresponding block data into the blockchain ledger in the target node.

15. A non-transitory computer-readable storage medium, storing a computer program, the computer program comprising executable instructions, and the executable instructions, when executed by a processor, implementing operations comprising:
    obtaining historical data synchronization information of adjacent nodes connected to a target node, wherein the historical data synchronization information comprises a historic error count rate for the adjacent nodes or a historic data transmission rate for the adjacent nodes;
    determining selection weight values for each of the adjacent nodes according to the historical data synchronization information, the selection weight values being used for measuring efficiency of the adjacent nodes synchronizing data to the target node, wherein the determining selection weight values for each of the adjacent nodes according to the historical data synchronization information comprises:
      detecting adjacent nodes having error counts not exceeding an error count threshold; and
      determining, according to the historical data synchronization information, selection weight values of the adjacent nodes having the error counts not exceeding the error count threshold;
    selecting, according to the selection weight values of the adjacent nodes, a target adjacent node for synchronizing data to the target node; and
    synchronizing target data from the target adjacent node with the target node.

16. An electronic device, comprising:
    a processor; and
    a memory, configured to store executable instructions of the processor,
    the processor being configured to execute the executable instructions to implement operations comprising:
      obtaining historical data synchronization information of adjacent nodes connected to a target node, wherein the historical data synchronization information comprises error counts of the target node and the adjacent nodes;
      determining selection weight values for each of the adjacent nodes according to the historical data synchronization information, the selection weight values being used for measuring efficiency of the adjacent nodes synchronizing data to the target node, wherein the determining selection weight values for each of the adjacent nodes according to the historical data synchronization information comprises:
- detecting adjacent nodes having error counts not exceeding an error count threshold; and
- determining, according to the historical data synchronization information, selection weight values of the adjacent nodes having the error counts not exceeding the error count threshold;
- selecting, according to the selection weight values of the adjacent nodes, a target adjacent node for synchronizing data to the target node; and
- synchronizing target data from the target adjacent node with the target node.

17. The electronic device according to claim 16, wherein the selecting, according to the selection weight values of the adjacent nodes, a target adjacent node for synchronizing data to the target node further comprises:
- detecting whether the adjacent nodes connected to the target node have data that needs to be synchronized to the target node, to obtain candidate adjacent nodes that need to synchronize data to the target node; and
- selecting, according to the selection weight values of the candidate adjacent nodes, the target adjacent node from among the candidate adjacent nodes for synchronizing data to the target node.

18. The electronic device according to claim 16, wherein the obtaining historical data synchronization information of adjacent nodes connected to a target node comprises:
- detecting whether the adjacent nodes connected to the target node have data that needs to be synchronized to the target node, to obtain candidate adjacent nodes that need to synchronize data to the target node; and
- obtaining historical data synchronization information of the candidate adjacent nodes.

19. The electronic device according to claim 16, wherein the electronic device comprises a blockchain system, the target data comprises block header data and complete block data, and the selecting, according to the selection weight values of the adjacent nodes, a target adjacent node for synchronizing data to the target node, and synchronizing target data in the target adjacent node to the target node further comprises:
- selecting, according to the selection weight values of the adjacent nodes, a first target adjacent node for synchronizing the block header data to the target node, and synchronizing the block header data from the first target adjacent node; and
- selecting, according to the selection weight values of the adjacent nodes after the block header data is synchronized, a second target adjacent node for synchronizing the complete block data to the target node, and synchronizing the complete block data from the second target adjacent node.

20. The method according to claim 19, wherein before the selecting a second target adjacent node for synchronizing the complete block data to the target node, the method further comprising:
- obtaining a height of a third block header with the complete block data of a blockchain ledger in the target node;
- obtaining a height of a fourth block header of the blockchain ledger in the target node; and
- comparing the height of the third block header with the height of the fourth block header to detect whether to select the second target adjacent node for synchronizing the complete block data to the target node.

\* \* \* \* \*